Patented Mar. 3, 1936

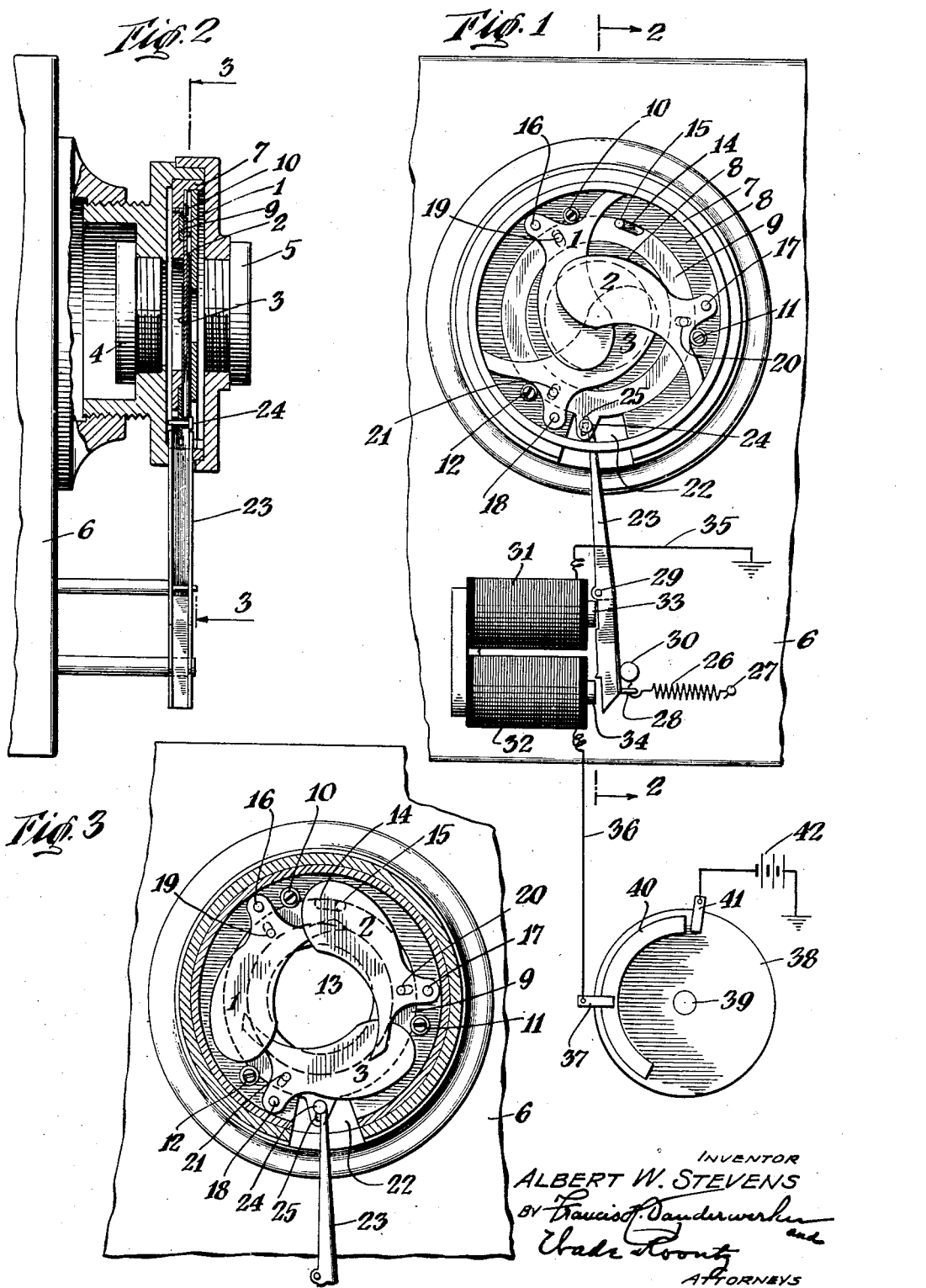

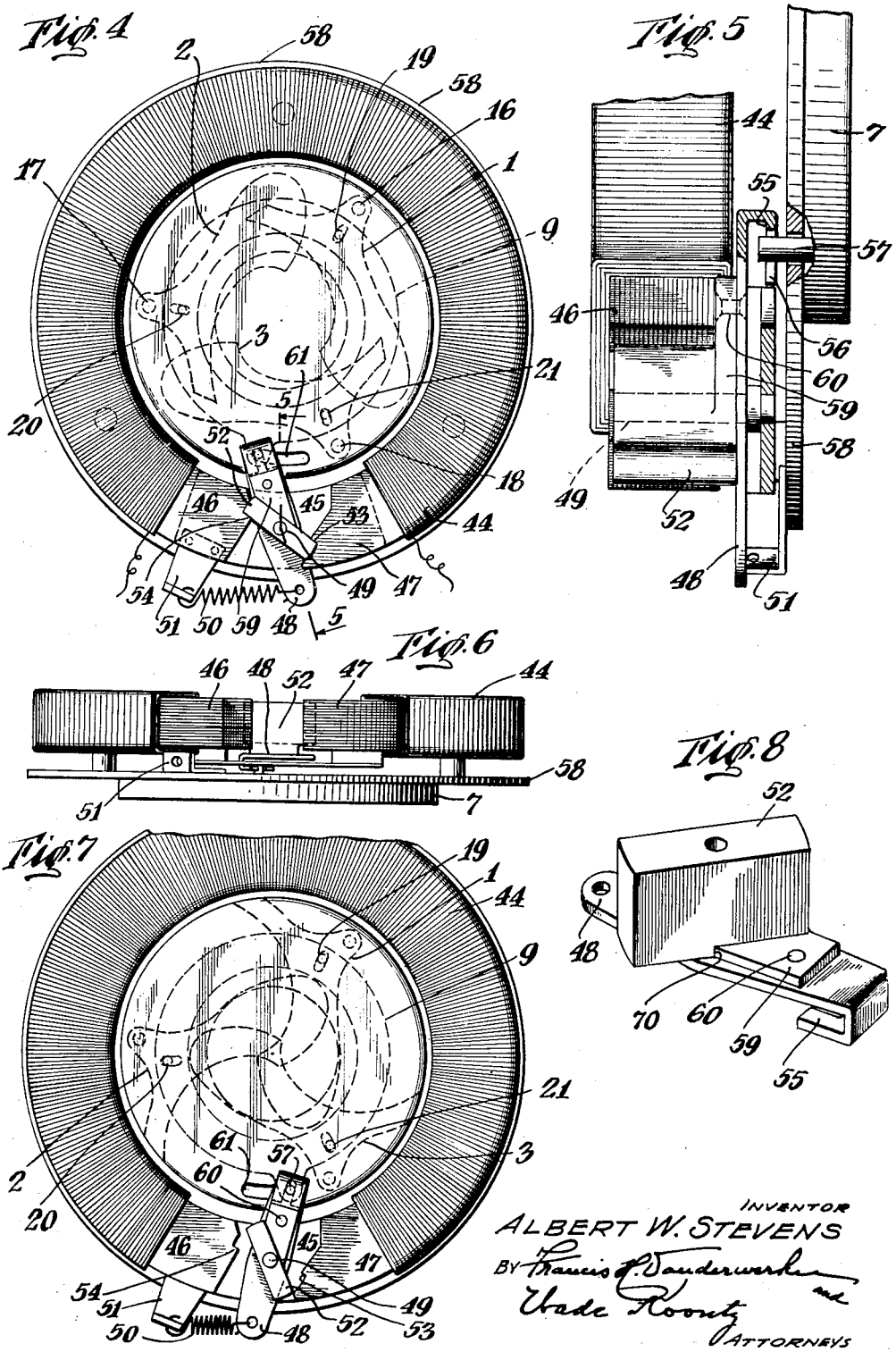

2,032,380

UNITED STATES PATENT OFFICE 2,032,380

ELECTRICALLY OPERATED CAMERA SHUTTER

Albert W. Stevens, Dayton, Ohio

Application April 27, 1934, Serial No. 722,749

22 Claims. (Cl. 95—63)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to camera shutters and means for operating the same and more particularly to a self-contained electrical means for directly operating the leaves of a between-the-lens shutter.

Heretofore it has been the conventional practice in ordinary cameras as well as aerial cameras to employ mechanical means for operating leaf shutters.

In other cameras there have been employed electrical means remotely arranged with respect to the shutter for controlling mechanical devices for tripping the shutter. Other shutter operating devices have employed spring operated devices which are electrically trigger operated to trip the shutter. Such devices have been found inadequate for high speed shutters. This is due partly to the fact that in an effort to reduce weight in a complicated set of levers, mal-function is only too apt to be occasioned. On the other hand, if strong rugged parts are used, too much electrical power is required to overcome the inertia of the heavy train of moving parts.

It is the purpose of this invention however to provide a simple, inexpensive and fool-proof self-contained electrically operated shutter control device adjacent the shutter, or to so construct the control device that it and the shutter may be both placed as a unit between the lens of a between-the-lens shutter type of camera. Moreover the shutter is actually and directly tripped by the electrical device as distinguished from spring operated trigger actuated devices. Thus the mechanical parts will be independent of those of the other operations of the camera and will be subject only to operation by a simple adjacent electrical control without the necessity of complicated intervening working parts which are subject to breakage and malfunction by reason of their lightness or which require too much power to move them in case they are built heavy and rugged. Such an arrangement is moreover particularly adapted for the control of shutters of a plurality of cameras.

It is further my object to provide a simple and efficient electromagnetic control device for the shutter which may be readily adjusted for various durations of photographic exposures.

With the foregoing and other objects in view the invention consists in the combination of parts and in the details of construction hereinafter set forth in the following specification and appended claims, certain embodiments thereof being illustrated in the accompanying drawings, in which:

Figure 1 is a top plan view of a leaf shutter of the between-the-lens type with one form of electrical control therefor showing the shutter closed;

Figure 2 is a view in section taken along line 2—2 of Figure 1 showing also the two lenses between which the shutter is placed;

Figure 3 is a view similar to Figure 1 showing the shutter opened;

Figure 4 is a top plan view of another form of electrical control in which the control and the shutter are placed as a unit between the camera lenses showing the position of the parts thereof when the shutter is open;

Figure 5 is a view in section taken along line 5—5 of Figure 4;

Figure 6 is a front elevational view of the same;

Figure 7 is a view similar to Figure 4 showing the shutter closed;

Figure 8 is a detail view in perspective of the operating lever shown in Figures 4 to 7 inclusive.

Referring more particularly to the drawings, the shutter comprising three or more leaves 1, 2 and 3 is shown carried between inner and outer lenses 4 and 5 of a camera 6. Such a construction is standard in many conventional cameras. The stationary shutter casing 7 is recessed on its inner upper face 8 to receive a relatively movable centrally apertured shutter leaf center operating ring 9 and maintained there by such means as screws 10, 11 and 12 in overlapping relationship with the ring. The inner portion of the face also indicated at 8 immediately surrounds the shutter opening 13. To limit the rotary sliding movement of the ring 9 it may be slotted at 14 to receive a pin 15 secured to the casing so that the length of the arcuate slot 14 determines the limit of movement of the ring. Each of the shutter leaves are pivotally connected to the casing and also to the disc for imparting simultaneous movement to open and close the shutter aperture. Thus leaf 1 is pivoted to a casing pin 16, leaf 2 to pin 17 and leaf 3 to pin 18. Leaf 1 carries a pin 19 adapted to removably fit into a recess in the ring 9 and leaves 2 are likewise secured to the disc through the medium of pins 20 and 21 respectively.

In Figure 1 I have shown a simple form of electromagnetic shutter control but it must be borne in mind that the actual finished device may have a widely different outward appearance and that the showing is more for the purpose of illustrating a principle of shutter control.

In any event I find it preferable to construct the control device so that it and the shutter may be both placed as a unit between the lens of a between-the-lens shutter type of camera, or in proper relationship in front or behind the camera lens. In other words, the shutter, the operating link 23 and the electromagnetic coils 31, 32 may be connected to each other and to a suitable supporting member also supporting the lens elements 3 and 4 so as to be bodily movable together as a complete unit into the proper relationship with the focal plane of the camera during assembly. It likewise follows that the unit so formed may be bodily moved as a unit away from relationship with the focal plane while disassembling the device. I may recess the casing at 22 and pivotally connect an armature 23 to the disc by means of a pin 24 riding in an elongated slot 25 in the operating ring.

A tension spring 26 secured to a stationary pin 27 and to the armature at 28 normally maintains the shutter closed by urging the armature rotated counterclockwise about its stationary pivot 29 until it abuts a stationary pin 30. The electrical system may include an electromagnet comprising a pair of wire wound cores 31 and 32 having pole faces 33 and 34, the wire 35 of the former core leading to a ground and the wire 36 of the latter core leading to a contact device 37. There may be provided an automatic circuit maker and breaker in the form of a disc 38 of insulating material rotatable about a shaft 39 and carrying a segment 40 of electrically conductive material. There may also be a contact maker 41, in circuit with a suitable battery 42, for engaging the segment 40.

Thus as long as segment 40 is not in contact with both elements 37 and 41, the electromagnet is not energized and the shutter remains closed until the disc 38 in rotating clockwise brings segment 40 into contact with element 41. This causes the cores to become energized and results in their attracting the armature against the action of the tension spring and held there until the lower extremity of the segment 40 passes beyond and out of contact with the contact device 37, at which time the electromagnet becomes de-energized and the spring 26 again holds the armature away from the cores to the position shown in Figure 1. As explained before, the electromagnet in pulling the armature about its pivot in a clockwise direction causes a rotation of the disc 9 in a counterclockwise direction so as to force the leaves to be pivoted outwardly about their pivots so as to leave the shutter aperture open, as shown in Figure 3, and reverse action naturally takes place when the circuit is broken and the spring 26 returns the armature into the position shown in Figure 1.

The shutter speed or in other words the duration of the exposure may be varied in accordance with the requirements by varying the speed of rotation of the disc 38 or a shortening or lengthening of the segment 40, or by an adjustment of the spacing between the contact devices 37 and 41 or by any other conventional means that may be found to be most practicable.

In Figures 4 to 8 inclusive, I have shown a modified form of electromagnet shutter control in which I may employ a horseshoe or substantially circular laminated wire core inside of which may be arranged the shutter and shutter operating means as well as the shutter and aperture in order to provide a compact arrangement of a self-contained unit. Thus in Figure 4 I have shown essentially the same type of disc 9 and shutter aperture 13, as previously described, but for the purposes of brevity, I will not repeat the description of the actual shutter leaves and the operation thereof as they may be and are shown to be of the same type and construction as those previously described. In order to provide a self-contained unit in its true sense I may prefer to surround the shutter housing with a substantially circular electromagnet with a casing 43 and place the unit including the control device and the shutter between the lenses 4 and 5. Inside the casing are laminations 44 at predetermined spaced intervals, there being formed an interrupted space 45 on either side of which are arranged pole faces 46 and 47 in the electrical field of the laminations. As is the case in the device previously described, the rotation of the disc 9 controls the opening and closing of the shutter. The position of the ring 9 in Figure 4 brings about the opening of the shutter in the same manner as previously described. A rotation of the disc in a counterclockwise direction brings about closing of the shutter aperture by moving the leaves into position shown in Figure 7 in the manner also previously described.

The laminations are naturally in circuit with suitable switching devices which may be operated by any conventional means. When the circuit is closed the lever 48 is rotated about its pivot 49 against the action of the tension spring 50 secured to the lever 48 and a suitable bracket 51, so as to assume the position shown in Figure 4 to rotate the leaf center operating ring 9 to bring the shutter into open position. This is accomplished by means of an armature 52, the armature being rigidly secured to the lever 48 so as to be rotatable therewith but not movable with relation thereto. The pole faces 46 and 47 are provided with notches having abutments 54 and 53 to limit the movement of the armature. Thus, when the electromagnet is energized one end of the armature 52 will be attracted by pole face 46 and simultaneously the other end will be attracted by pole face 47, and the armature and lever 48 will be rotated into the position shown in Figure 4 and the abutments 54 and 53 will prevent further rotation. Upon de-energization of the electromagnet, the spring 50 will return the lever 48 by rotating it in a clockwise direction about its pivot. This action causes a movement of the shutter leaf center operating ring 9 in a counterclockwise direction by means of its connection 55, 56 to the lever 48 and this movement of the shutter operating ring 9 causes the shutter to become closed and the leaves to assume the position shown in Figure 7.

The armature 52 is disposed angularly with relation to the lever 48 and may be maintained in such relation to lever 48 by not only the fastening pin 49 but also by connecting an intervening plate 59 by fastenings 69 to lever 48 and notching armature 52 at 70 to engage the side edge of plate 60.

From the foregoing it will be seen that I have provided a simple self-contained unit comprising a shutter and a positive electrical control for tripping the shutter, which unit may be so compact as to be readily installed between the lens of a between-the-lens shutter type of camera. It will also be seen that such an arrangement is admirably suited for synchronous operation of a plurality of cameras.

I claim:

1. In combination in a camera, a lens having a plurality of lens elements, a self-contained shutter unit fitting between said lens elements and including a shutter and an electrical means arranged substantially annularly of said lens for directly actuating said shutter to open position.

2. In combination in a camera, a lens having a plurality of lens elements, a self-contained shutter unit fitting between said lens elements and including a shutter and an electrical means for directly actuating said shutter to open position, said means including an electrical circuit and an automatically operating means for predetermining the time interval involved in the opening and closing of the shutter.

3. In combination in a camera, a lens having a plurality of lens elements, a self-contained shutter unit fitting between said lens elements and including a shutter and an electrical means for directly actuating said shutter to open position, said means comprising a shutter actuating element, an electromagnet adapted to become energized so as to operate said shutter actuating element to open said shutter and resilient means for returning said shutter to closed position upon the de-energization of said electromagnet, said electrical means including an electrical circuit and an automatically operating means for predetermining the time interval involved in the opening and closing of the shutter.

4. In combination in a camera, a lens having a plurality of lens elements, a between-the-lens leaf shutter, a self-contained electrical means arranged adjacent said shutter and substantially annularly of said lens for directly and positively operating said shutter to open position.

5. In combination in a camera, a lens having a plurality of lens elements, a between-the-lens leaf shutter, a self-contained electrical means arranged adjacent said shutter and substantially annularly of said lens for directly and positively operating said shutter to open position, and means for automatically closing said shutter.

6. In combination in a camera, a lens having a plurality of lens elements, a between-the-lens leaf shutter, a self-contained electrical means arranged adjacent said shutter and substantially annularly of said lens for directly and positively operating said shutter to open position, and resilient means for automatically closing said shutter.

7. In combination in a camera, a lens having a plurality of lens elements, a between-the-lens leaf shutter, a self-contained electrical means adjacent said shutter for directly and positively operating said shutter to open position, said means comprising an electro-magnetic device arranged substantially annularly about said lens elements and adapted upon energization to bring about said shutter operation.

8. In combination is a camera, a lens having a plurality of lens elements, a between-the-lens leaf shutter, a self-contained electrical means arranged adjacent said shutter and substantially annularly of said lens elements for directly and positively operating said shutter to open position, and resilient means for closing said shutter.

9. In combination in a camera, a lens having a plurality of lens elements, a between-the-lens leaf shutter, a self-contained electrical means adjacent said shutter for directly and positively operating said shutter to open position, said means comprising an electro-magnetic device arranged substantially annularly about said lens elements and adapted upon energization to bring about said shutter operation, and means for automatically closing said shutter upon deenergization of said device.

10. In combination in a camera, a lens having a plurality of lens elements, a between-the-lens leaf shutter, a self-contained electrical means adjacent said shutter for directly and positively operating said shutter to open position, said means comprising an electro-magnetic device arranged substantially annularly about said lens elements and adapted upon energization to bring about said shutter operation, and means for automatically closing said shutter upon deenergization of said device, said electrical means including an electrical circuit and an automatically operating means for predetermining the time interval involved in the opening and closing of the shutter.

11. In combination in a camera, a lens having a plurality of lens elements, a between-the-lens leaf shutter, a self-contained electrical means arranged adjacent said shutter and substantially annularly of said lens for directly and positively operating said shutter to open position, and resilient means for closing said shutter, said electrical means including an electrical circuit and an automatically operating means for predetermining the time interval involved in the opening and closing of the shutter.

12. In combination in a camera, a lens having a plurality of lens elements, a between-the-lens leaf shutter, a self-contained electrical means arranged adjacent said shutter and substantially annularly of said lens for directly and positively operating said shutter to open position.

13. In combination in a camera, a lens having a plurality of lens elements, a between-the-lens leaf shutter, a self-contained electrical means arranged adjacent said shutter and substantially annularly of said lens for directly and positively operating said shutter to open position, and means for automatically closing said shutter.

14. In combination in a camera, a lens having a plurality of lens elements, a between-the-lens leaf shutter, a self-contained electrical means arranged adjacent said shutter and substantially annularly of said lens for directly and positively operating said shutter to open position, and resilient means for automatically closing said shutter.

15. In combination in a camera, a lens having a plurality of lens elements, a between-the-lens shutter, a self-contained electrical means adjacent said shutter for directly and positively operating said shutter to open position, said means comprising an electro-magnetic device arranged substantially annularly about said lens and adapted upon energization to bring about said shutter operation.

16. In combination in a camera, a lens having a plurality of lens elements, a between-the-lens leaf shutter, a self-contained electrical means arranged adjacent said shutter and substantially annularly of said lens for directly and positively operating said shutter to open position, and resilient means for closing said shutter.

17. In combination in a camera, a lens having a plurality of lens elements, a between the-lens leaf shutter, a self-contained electrical means adjacent said shutter for directly and positively operating said shutter to open position, said means comprising an electromagnetic device arranged substantially annularly about said lens and adapted upon energization to bring about said shutter operation, and means for automatically closing said shutter upon deenergization of said device.

18. In combination in a camera, a lens having a plurality of lens elements, a between-the-lens leaf shutter, a self-contained electrical means adjacent said shutter for directly and positively operating said shutter to open position, said means comprising an electromagnetic device arranged substantially annularly about said lens and adapted upon energization to bring about said shutter operation, and means for automatically closing said shutter upon deenergization of said device, said electrical means including an electrical circuit and an automatically operating means for predetermining the time interval involved in the opening and closing of the shutter.

19. In combination in a camera, a lens having a plurality of lens elements, a between-the-lens leaf shutter, a self-contained electrical means arranged adjacent said shutter and substantially annularly of said lens for directly and positively operating said shutter to open position, and resilient means for closing said shutter, said electrical means including an electrical circuit and an automatically operating means for predetermining the time interval involved in the opening and closing of the shutter.

20. In combination in a camera, a lens, a shutter, electrical means adjacent said lens for directly operating said shutter to open position, said lens, shutter and shutter operating means being movable as a unit into assembled position and in proper relationship with the focal plane of said camera and removable as a unit into disassembled position.

21. In combination in a camera, a lens, a shutter, a self-contained electrical means arranged adjacent said shutter and substantially annularly of said lens and shutter for directly and positively operating said shutter to open position.

22. In combination in a camera, a lens having a plurality of lens elements, a shutter, a self-contained electrical means arranged adjacent said shutter for directly and positively operating said shutter to open position, means for automatically closing said shutter, said electrical means including an electric circuit, a source of electric power and an automatically operating means for predetermining the time interval involved in the opening and closing of the shutter.

ALBERT W. STEVENS.